United States Patent
Strupp et al.

(10) Patent No.: US 11,408,810 B2
(45) Date of Patent: Aug. 9, 2022

(54) TEST DEVICE FOR DETERMINING THE PARTICLE LOADING OF HIGHLY PRESSURISED HYDROGEN

(71) Applicant: HYDAC ACCESSORIES GMBH, Sulzbach/Saar (DE)

(72) Inventors: Markus Strupp, Noswendel (DE); Stefan Christian Sauer, Schwalbach/Elm (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 425 days.

(21) Appl. No.: 16/623,867

(22) PCT Filed: Jun. 26, 2018

(86) PCT No.: PCT/EP2018/067057
§ 371 (c)(1),
(2) Date: Dec. 18, 2019

(87) PCT Pub. No.: WO2019/002260
PCT Pub. Date: Jan. 3, 2019

(65) Prior Publication Data
US 2020/0166447 A1    May 28, 2020

(30) Foreign Application Priority Data
Jun. 27, 2017   (DE) ..................... 10 2017 006 063.0

(51) Int. Cl.
*F17C 13/00*    (2006.01)
*G01N 15/06*    (2006.01)
(Continued)

(52) U.S. Cl.
CPC ........... *G01N 15/0618* (2013.01); *F17C 1/00* (2013.01); *F17C 13/00* (2013.01); *G01N 1/2205* (2013.01);
(Continued)

(58) Field of Classification Search
CPC ....... G01N 2001/2238; G01N 15/0618; G01N 1/2205; F17C 2270/0168; F17C 2221/012;
(Continued)

(56) References Cited

U.S. PATENT DOCUMENTS

| 3,015,228 A | 1/1962 | Shuttleworth et al. |
| 2009/0056417 A1* | 3/2009 | Kilps .................... G01N 1/2205 73/28.04 |

FOREIGN PATENT DOCUMENTS

| DE | 44 30 471 | 2/1996 |
| DE | 197 36 846 | 3/1999 |

(Continued)

OTHER PUBLICATIONS

International Search Report (ISR) dated Sep. 26, 2018 in International (PCT) Application No. PCT/EP2018/067057.

*Primary Examiner* — Jason K Niesz
(74) *Attorney, Agent, or Firm* — Wenderoth, Lind & Ponack, L.L.P.

(57) ABSTRACT

A test device for determining the particle load of pressurized hydrogen includes a housing (2), with an inlet (4) and an outlet (8) for the inflow or outflow of hydrogen, respectively. A sampling chamber (52) has a filter holder (44) for a test filter (58). A sample amount of hydrogen can flow through the test filter during a test procedure. After the test procedure has been completed, the test filter can be removed from the sampling chamber (52) for evaluating the deposition of particles. A venting device (64, 70) for reducing the pressure in the sampling chamber (52) is arranged inside the housing (2) and discharges any remaining hydrogen, at least partially, in the direction of the inlet (4) of the test device after the hydrogen has stopped flowing from the testing device.

10 Claims, 2 Drawing Sheets

(51) Int. Cl.
*F17C 1/00* (2006.01)
*G01N 1/22* (2006.01)

(52) U.S. Cl.
CPC ............... *F17C 2205/0335* (2013.01); *F17C 2205/0341* (2013.01); *F17C 2221/012* (2013.01); *F17C 2270/0168* (2013.01); *G01N 2001/2238* (2013.01)

(58) Field of Classification Search
CPC ...... F17C 2205/0341; F17C 2205/0335; F17C 13/00; F17C 1/00
See application file for complete search history.

(56) References Cited

FOREIGN PATENT DOCUMENTS

| | | |
|---|---|---|
| DE | 199 63 388 | 7/2001 |
| DE | 10 2012 005 719 | 9/2013 |
| EP | 1 688 731 | 8/2006 |
| WO | 2013/139462 | 9/2013 |

* cited by examiner

TEST DEVICE FOR DETERMINING THE PARTICLE LOADING OF HIGHLY PRESSURISED HYDROGEN

FIELD OF THE INVENTION

The invention relates to a test device for determining the particle load of pressurized hydrogen, comprising a housing, which has an inlet and an outlet for the inflow and outflow of hydrogen, respectively, and a sampling chamber, in which a filter holder for a test filter is provided. A sample amount of hydrogen can flow through the test filter during a test procedure. After the test procedure has been completed, the test filter can be removed from the sampling chamber for evaluating the deposition of particles. A venting device reduces the pressure in the sampling chamber.

BACKGROUND OF THE INVENTION

A test device of this type is known, cf. WO 2013/139462 A1. Such devices are primarily for use in hydrogen filling systems, i.e, in particular in engine applications where hydrogen is used as gaseous fuel or for supplying fuel cells with hydrogen. For the failure-free operation of hydrogen-powered internal combustion engines and of fuel cells, the hydrogen has to be completely free of particulate foreign matter. The absence of particles therefore makes an important contribution to ensuring the safe operation of the facilities to be supplied with hydrogen.

When using the known test device mentioned, the test procedure is performed in the course of a filling operation, in which the inlet of the housing of the test device is connected to an $H_2$ filling station and the outlet is connected to a fuel nozzle via a tank hose, for example for filling a vehicle. During this process, in which the connection to the tank of the consumer is established via the fuel nozzle, the filling quantity constituting the sample quantity flows through the test filter located in the sampling chamber. In order to be able to remove the test filter to check it for deposits after the filling process has ended, the sampling chamber that is pressurized to the high filling pressure of 800 bar or higher must be depressurized. To this end, a manually operable ventilation valve as a venting device located on the outside of the housing has to be opened in the mentioned known test device. The venting valve has an outlet nozzle through which the gas volume located in the sampling chamber and in the tank hose and in the connection to the $H_2$-filling station is vented to the environment. These connections can now be removed from the inlet and outlet of the housing to transport the housing to a laboratory, where it is opened to inspect the test filter for deposits and analyze any deposits found.

SUMMARY OF THE INVENTION

Based on this state of the art, the invention addresses the problem of providing a test device of the type mentioned at the outset, which is characterized by a particularly safe operational behavior.

According to the present invention, this problem is basically solved by a test device having, as an essential feature of the invention, a venting device arranged inside the housing that discharges any remaining hydrogen, at least partially, in the direction of the inlet of the test device after the hydrogen has stopped flowing from the testing device. As a result, at the end of the filling process, the venting operation is automatically performed via the venting system provided in the filling stations approved for high-pressure hydrogen filling. Therefore, it is not necessary to vent the device manually using a drain valve, which could create a dangerous hydrogen atmosphere in the vicinity.

In advantageous embodiments, the venting device comprises two valves. The first valve opens the flow path from the inlet to the outlet via the test filter while the second valve is closed. The second valve opens under the pressure of the hydrogen remaining in the testing device at a predetermined threshold after the flow at the outlet has stopped. In that way, the venting device performs the venting in the direction of the inlet while the first valve is closed.

Advantageously, the two valves may be formed of spring-loaded check valves. The first valve, starting from its closed position, opens in the direction of the outlet, and the second valve opens in the opposite direction towards the inlet.

Advantageously, the arrangement is such that the second valve is arranged in a connection line in a bypass of the first valve. One end of the connection line opens into a connection point between the test filter and the outlet. The other end of the connection line opens into a further connection point between the inlet and the first valve of the flow path. With this arrangement of the connection line, the flow path, which is routed through the connection line when the second valve is open, bypasses the test filter preventing any undesired return flow in that way.

In order to perform a test procedure, the inlet can be connected to a hydrogen storage tank, in particular at a gas station, and the outlet for the delivery of hydrogen to a vehicle can be connected to a fuel nozzle via a hose line, resulting in an automatic venting by the venting device after a filling or withdrawal process by a ventilation system of the filling station.

In advantageous exemplary embodiments, the housing is formed of a plurality of parts, in particular two parts. The two housing parts are interconnected by a detachable union nut. A rotation lock can be provided for the detachable unit nut, which rotation lock fastens the union nut in the tightened rotational position.

Advantageously, the two valves in the form of built-in check valves can be installed in the one housing part having the inlet.

The test filter can advantageously be attached between the two housing parts in the sampling chamber having the filter holder. The sampling chamber has one conical extension each at the two free ends of the test filter. The extension tapers in opposite directions away from the test filter and opens into the flow path between the inlet and outlet.

To form a sealed transition of the connection line containing the second valve between the two housing parts, a connecting tube can advantageously be arranged in the connection line and between the two housing parts and engaged therewith. The connecting tube is routed in the respective housing parts by at least one sealing element in a sealed manner and penetrates the separation point between the two housing parts.

Preferably, the components of the testing device, including the valves used and their sealing elements, are formed from stainless steel materials.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
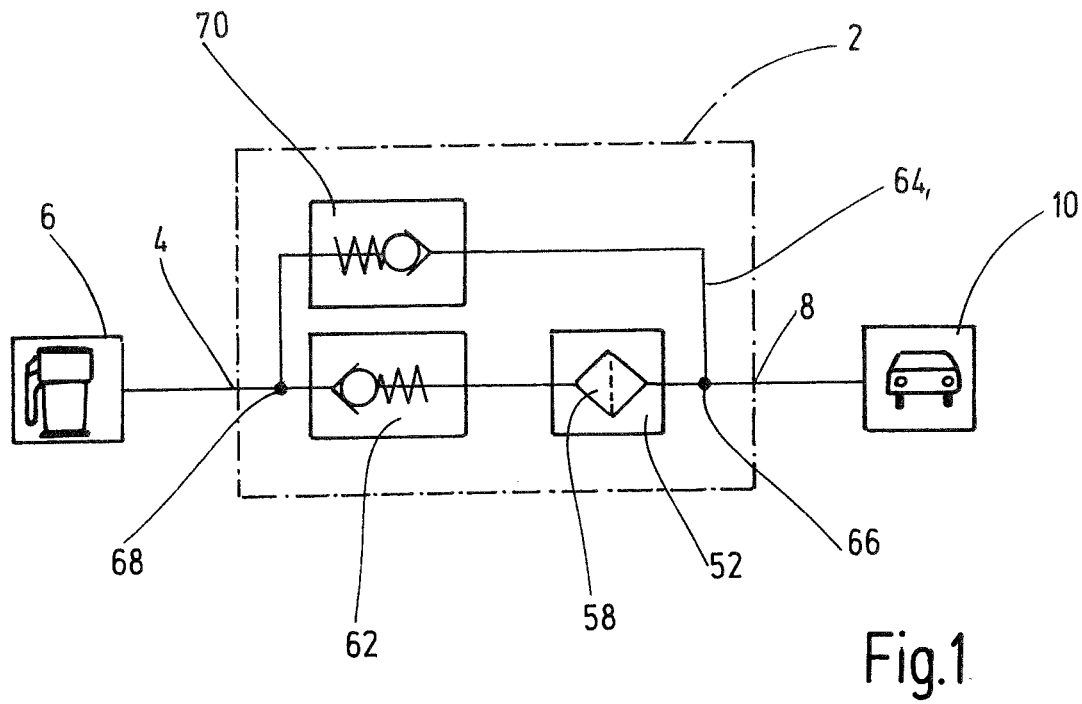
FIG. 1 is a symbolic or flow diagram of a fluid circuit of a test device according to an exemplary embodiment of the, inserted between an $H_2$-filling station and a motor vehicle to be refueled.

The schematic illustration of FIG. 1 illustrates the arrangement for a process to be performed in the course of a filling operation, in which the inlet 4 of the device housing 2 is connected to a source of high pressure hydrogen in the form of an $H_2$-filling station 6 and the outlet 8 of the housing 2 is connected to a vehicle 10 to be refueled. At the inlet 4, the housing 2 has a tank nipple 12 in the form of a screw-in part located in a female threaded drilled hole 14 at the input 4 for connection to the filling station 6. At the opposite outlet, 8 a connection tube 18 is screwed to the female thread in a drilled hole 16, which connection tube can be connected to a tank hose, also not shown, on which a fuel nozzle for filling of the vehicle 10 is arranged.

Figure 2:
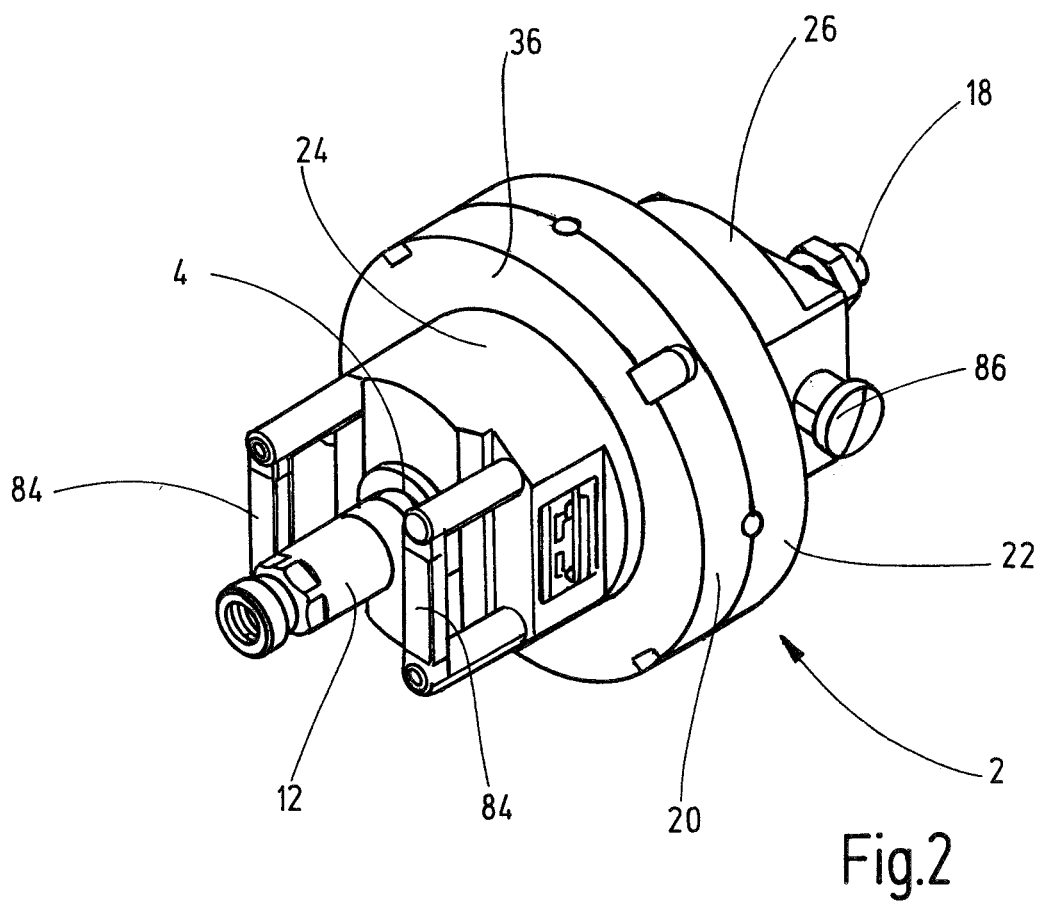
FIG. 2 is a perspective view of the exemplary embodiment, as seen on the inlet of the device housing to be connected to the filling station.

The housing 2 made of stainless steel has two housing parts, each having a circular cylindrical flange 20 and 22 having the same diameter and connecting the respective coaxial connecting parts 24 and 26. The connecting part 24 has the drilled hole 14 of the inlet 4 at its free end. The connection part 26 has the drilled hole 16 of the outlet 8 at its outer end. The connecting parts 24, 26 have, on the whole, the shape of circular cylinders, reduced in diameter relative to the flange parts 20, 22, having opposing flattenings, see FIG. 2. When the housing 2 is closed, the end faces 28 and 30, which lie in a radial plane, of the flange parts 20 and 22 are in contact with each other. A union nut 32 is provided for the pressure-resistant and detachable contact of the end faces 28, 30, which union nut can be rotated around a male thread 34 of the flange 22 and has a ring part 36 extending across the other flange 20. The union nut 32 has radially outer drill holes 38 for tightening by means of a hook wrench. The union nut 32 can be secured in the tightened position by a spring-loaded locking pin 40 penetrating the ring part 36.

To center and mutually seal the abutting end faces 28 and 30 of the flange parts 20, 22, the end face 28 has a concentric, axially projecting annular rib 42, which engages with an annular groove 44 in the other end face 30. A sealing ring 46 is inserted in an extension of the annular groove 44. In a corresponding manner, as in the mentioned test device known from WO 2013/139462 A1, coaxial depressions 48 and 50 are formed in the flange parts 20 and 22 starting from the end faces 28 and 30, which depressions define a sampling chamber 52. The recesses 48, 50 are, as in the mentioned known device, each formed by a cone having a right-angled vertex. A coaxial inflow channel 54 opens at the vertex of the recess 48, which inflow channel is connected to the tank nipple 12 via the inlet 4. A discharge channel 56 extends from the apex of the other recess 50 to the connection pipe 18 via the outlet 8.

A test filter 58 in the form of a sheet-shaped, circular membrane is arranged in the sampling chamber 52. It may be a paper filter having a filter fineness in the range of 0.2 μm or a PTFD membrane having a laminated support structure. Such filters may have a thickness of 0.15 mm. A support filter 60 in the form of a circular plate is provided as a holder for such a sheet-shaped element, at whose end facing the inflow channel 54 the test filter 58 is located. The thickness of the plate of the support filter 60 in this example is 5 mm. The support filter 60 is formed of a sintered metal having a porosity corresponding to a filter fineness in the range of 150 μm. The plate of the support filter 60 is held between the annular rib 42 of the end surface 28 and the bottom of the annular groove 44 in the end surface 30.

Figure 3:
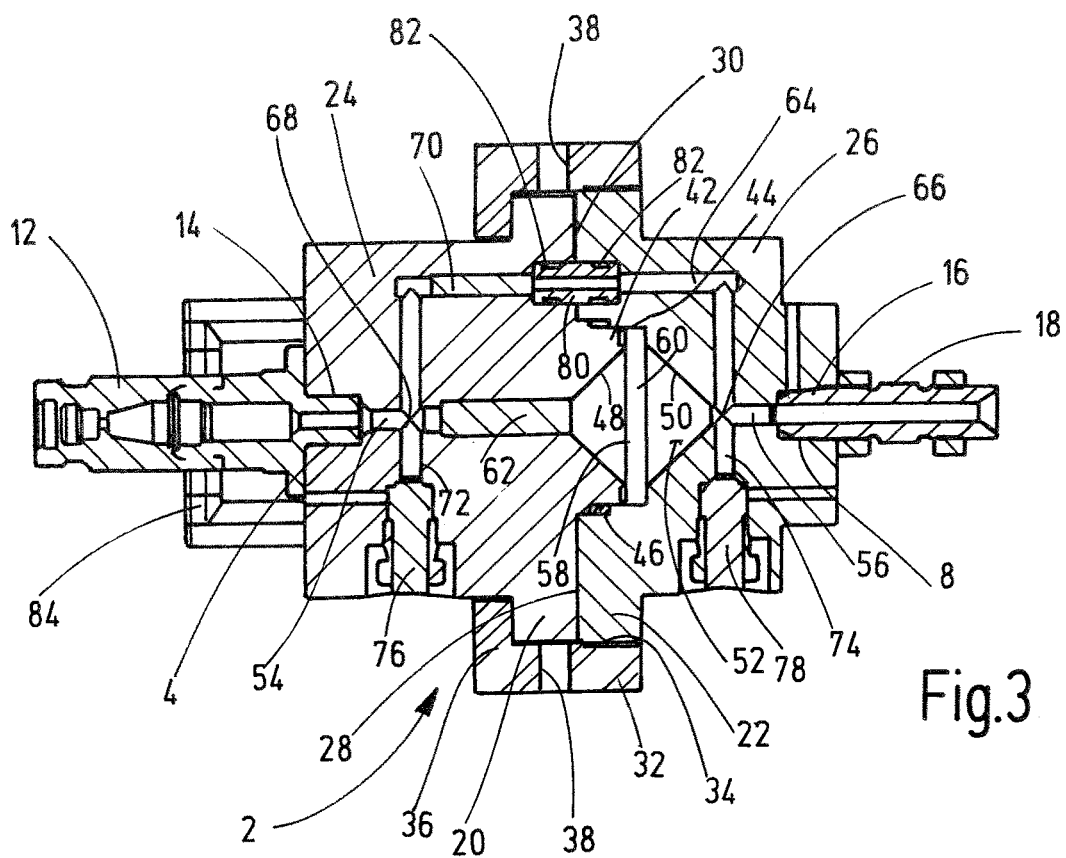
FIG. 3 is a side view in section of the exemplary embodiment.
Figure 4:
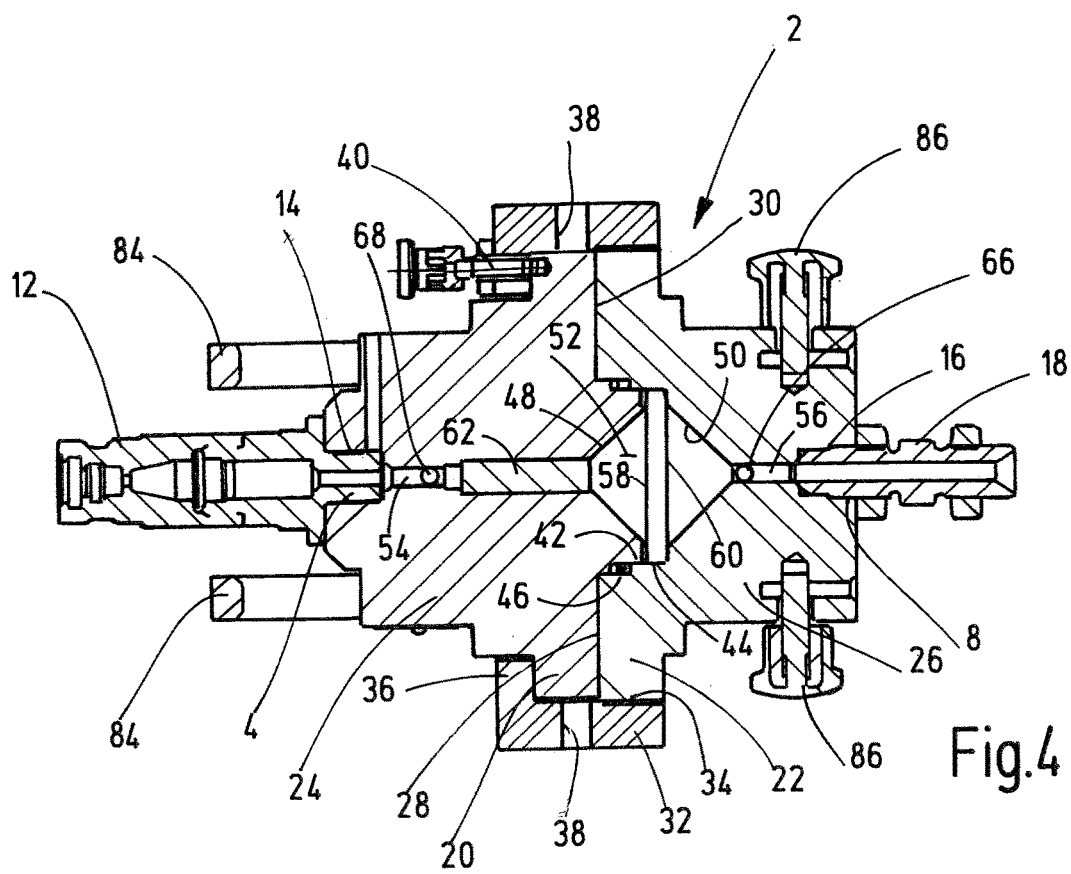
FIG. 4 is a plan view in section of the exemplary embodiment where the cutting plane is rotated by 90° with respect to FIG. 3.

A first valve is in the form of a spring-loaded check valve 62, opens in the direction of the sampling chamber 52, and is arranged in the end region of the feed line 54, which opens into the sampling chamber 52. A connection line 64 (see FIG. 3) is provided as a bypass to the check valve 62. One end of connection line 64 opens into a junction 66 between the test filter 58 and the outlet 8. The other end of connection line 64 opens into a junction 68 between the inlet 4 and the first valve-forming check valve 62. A second valve is arranged in this connection line 64, which second valve is also designed as a spring-loaded check valve 70 and opens in the direction of the connection point 68, and thus, in the direction of the outlet 4. Both check valves 62 and 70 are designed as built-in check valves in the cartridge design. All valve components are made of stainless steel. As shown in FIG. 3, the drilled holes 72 and 74, which form the ends of the connection line 64, are closed by threaded plugs 76 and 78. As also shown in FIG. 3, the transition of the connection line 64 is formed at the separating point formed between the end faces 28 and 30 by a connecting tube 80 which is sealed by sealing elements 82 in the respective flange parts 20, 22.

To facilitate the handling of the test device for performing a filling and test procedure, handle strips 84 are provided at the end face of the connection part 24 next to the tank nipple 12 on the housing 2. For the test procedure performed during filling of the vehicle 10, the tank nipple 12 is connected to the filling coupling of the $H_2$ filling station 6, and a tank hose with a fuel nozzle is attached to the connecting pipe 18. For this purpose, conventional excess flow cutoff valves on the tank hose can be secured to the housing 2 by retaining bolts 86, which protrude laterally from the connecting part 24 and can be hooked into the eyelets provided. The first check valve 62 opens during the filling operation performed now, such that the flow is routed through the test filter 58. Closing the fuel nozzle at the end of filling procedure activates the venting system of the filling station 6. The hydrogen pressure present in the sampling chamber 52 and in the tank hose connected to the outlet 8 closes the first check valve 62 and opens the second check valve 70 located in the connection line 64, such that the second valve 70 serves as a vent valve, performing the pressure reduction to the outlet 4 and thereby to the venting system of the filling station 6. Without having to perform a manual venting action via a drain valve, the test device can now be disconnected and opened in a laboratory to analyze any deposits on the test filter 58.

While one embodiment has been chosen to illustrate the invention, it will be understood by those skilled in the art that various changes and modifications can be made therein without departing from the scope of the invention as defined in the claims.

The invention claimed is:
1. A test device for determining the particle load of pressurized hydrogen, the test device comprising:
   a housing an inlet for inflow of hydrogen and an outlet for outflow of hydrogen;
   a sampling chamber in the housing having a filter holder removably holding a test filter through which a sample amount of hydrogen is flowable from the inlet to the outlet during a test procedure, the test filter being removable from the housing after completion of the test procedure for evaluation of particles disposed on the test filter; and
   a vent reducing pressure being in the sampling chamber, being arranged inside the housing and at least partially discharging any remaining hydrogen in the sampling chamber in a direction of the inlet after hydrogen flow is stopped flowing from the outlet.
2. The test device according to claim 1 wherein the inlet is capable of being connected to a hydrogen storage tank, and the outlet is capable of delivering hydrogen to a vehicle via a connection to a hose line and a fuel nozzle, resulting in an automatic venting by the vent after a filling or withdrawal process.
3. The test device according to claim 1 wherein the housing comprises first and second housing parts interconnected by a detachable union nut.
4. The test device according to claim 1 wherein the vent comprises first and second check valves held in the first housing part, the first housing part having the inlet.
5. The test device according to claim 1 wherein the housing comprises interconnected first and second housing parts; and
   the test filter is held in the filter holder in the sampling chamber between the first and second housing parts, the sampling chamber having first and second conical extensions at first and second free ends of the test filter, respectively, the first and second conical extensions tapering in opposite directions away from the test filter and opening into a flow path between the inlet and outlet.
6. The test device according to claim 1 wherein the vent formed by valves and sealing elements in the housing are formed of stainless steel materials.
7. The test device according to claim 1 wherein the vent comprises first and second valves, the first valve opening a flow path from the inlet to the outlet via the test filter while the second valve is closed, the second valve opening when the hydrogen flow at the outlet under pressure of the hydrogen remaining in the sampling chamber is at a predetermined threshold such that venting of the hydrogen in the direction of the inlet is performed while the first valve is closed.
8. The test device according to claim 7 wherein the first and second valves are spring-loaded check valves, the first valve starting from a closed position thereof, opening in a direction of the outlet, the second valve opening in an opposite direction towards the inlet.
9. The test device according to claim 7 wherein the second valve is arranged in a connection line bypassing the first valve, a first end of the connection line opening into a first connection point between the test filter and the outlet, a second end of the connection line opening into a second connection point between the inlet and the first valve.
10. The test device according to claim 9 wherein a connecting tube is arranged in the connection line between first and second housing parts of the housing, is engaged with first and second housing parts of the housing, and penetrates a separation point between the first and second housing parts of the housing, a seal between the connecting tube and the first and second housing parts forming a sealed connection therebetween.

* * * * *